United States Patent
Onda et al.

(10) Patent No.: US 10,920,070 B2
(45) Date of Patent: Feb. 16, 2021

(54) POLY(BUTYLENE TEREPHTHALATE) COMPOSITION AND ASSOCIATED ARTICLE

(71) Applicant: SABIC Global Technologies B.V., Bergen Op Zoom (NL)

(72) Inventors: Kayoko Onda, Tochigi (JP); Kazuhiko Mitsui, Tochigi (JP)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 120 days.

(21) Appl. No.: 15/574,883

(22) PCT Filed: May 20, 2016

(86) PCT No.: PCT/EP2016/061389
§ 371 (c)(1),
(2) Date: Nov. 17, 2017

(87) PCT Pub. No.: WO2016/188890
PCT Pub. Date: Dec. 1, 2016

(65) Prior Publication Data
US 2018/0163043 A1 Jun. 14, 2018

Related U.S. Application Data

(60) Provisional application No. 62/166,170, filed on May 26, 2015.

(51) Int. Cl.
| | | |
|---|---|---|
| *C08L 67/02* | (2006.01) | |
| *C08K 3/32* | (2006.01) | |
| *C08L 63/00* | (2006.01) | |
| *C08L 23/08* | (2006.01) | |
| *B60Q 1/04* | (2006.01) | |
| *B32B 1/04* | (2006.01) | |
| *B32B 27/36* | (2006.01) | |
| *B32B 15/09* | (2006.01) | |
| *B32B 27/18* | (2006.01) | |
| *B32B 27/20* | (2006.01) | |
| *C08L 67/03* | (2006.01) | |
| *C08K 5/00* | (2006.01) | |
| *F21S 41/30* | (2018.01) | |
| *F21S 41/37* | (2018.01) | |

(52) U.S. Cl.
CPC .............. *C08L 67/02* (2013.01); *B60Q 1/04* (2013.01); *C08K 3/32* (2013.01); *C08L 23/0884* (2013.01); *C08L 63/00* (2013.01); *B32B 15/09* (2013.01); *B32B 27/18* (2013.01); *B32B 27/20* (2013.01); *B32B 27/36* (2013.01); *B32B 2255/10* (2013.01); *B32B 2255/205* (2013.01); *B32B 2307/40* (2013.01); *B32B 2307/416* (2013.01); *B32B 2307/71* (2013.01); *B32B 2307/712* (2013.01); *B32B 2307/714* (2013.01); *B32B 2367/00* (2013.01); *B32B 2457/00* (2013.01); *B32B 2551/00* (2013.01); *C08K 5/005* (2013.01); *C08L 23/08* (2013.01); *C08L 23/0846* (2013.01); *C08L 23/0869* (2013.01); *C08L 67/03* (2013.01); *C08L 2201/08* (2013.01); *C08L 2205/03* (2013.01); *C08L 2205/035* (2013.01); *F21S 41/30* (2018.01); *F21S 41/37* (2018.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | | | |
|---|---|---|---|---|
| 4,284,540 A * | 8/1981 | Iida | ........................ | C08K 5/098 524/400 |
| 4,753,980 A * | 6/1988 | Deyrup | .................... | C08L 67/02 524/369 |
| 4,898,911 A * | 2/1990 | Miyashita | ............ | C08G 81/021 525/201 |
| 5,021,495 A * | 6/1991 | Minnick | .............. | C08K 3/0058 524/410 |
| 5,296,550 A * | 3/1994 | Natarajan | ................ | C08L 23/02 525/170 |

(Continued)

FOREIGN PATENT DOCUMENTS

| | | | | |
|---|---|---|---|---|
| CN | 103897215 A | * | 7/2014 | |
| JP | 2009-215347 A | * | 9/2009 | |
| WO | 2004106405 A1 | | 12/2004 | |
| WO | 2007111890 A2 | | 10/2007 | |
| WO | 2008052988 A1 | | 5/2008 | |
| WO | WO 2008-052998 A | * | 5/2008 | |

OTHER PUBLICATIONS

"Phosphinate—Wikipedia" (https://en.wikipedia.org/wiki/Phosphinate) (webpage retrieved Jan. 6, 2020) (Year: 2020).*
International Search Report for PCT/EP2016/061389 dated Aug. 1, 2016, 3 pages.
Written Opinion of International Search Report for PCT/EP2016/061389, dated Aug. 1, 2016, 6 pages.

*Primary Examiner* — Vivian Chen
(74) *Attorney, Agent, or Firm* — Cantor Colburn LLP

(57) ABSTRACT

A composition includes specific amounts of a poly(alkylene terephthalate) and an epoxy compound having a weight average molecular weight of at least (500) daltons, and an epoxy equivalent weight of at least (400) grams per equivalent. The composition exhibits high melt flow, and articles molded from the composition exhibit reduced high-temperature outgassing compared to corresponding compounds without the epoxy compound. The composition is suitable for molding directly metallizable reflectors and bezels for automotive headlights.

16 Claims, No Drawings

(56) References Cited

U.S. PATENT DOCUMENTS

| | | | | |
|---|---|---|---|---|
| 5,362,570 A * | 11/1994 | Rober | B32B 27/08 | 428/475.2 |
| 5,436,296 A * | 7/1995 | Swamikannu | C08L 67/02 | 525/166 |
| 5,723,520 A * | 3/1998 | Akkapeddi | C08K 5/098 | 523/455 |
| 5,795,935 A * | 8/1998 | Mutsuda | C08L 67/02 | 525/166 |
| 5,965,639 A * | 10/1999 | Yamauchi | C08K 3/02 | 524/414 |
| 6,020,414 A * | 2/2000 | Nelsen | C08L 23/08 | 524/424 |
| 6,503,969 B1 * | 1/2003 | Klatt | C08K 5/5313 | 524/126 |
| 6,893,147 B2 | 5/2005 | Schottland et al. | | |
| 6,984,694 B2 * | 1/2006 | Blasius, Jr. | C08F 220/32 | 525/123 |
| 8,148,489 B2 | 4/2012 | Peacock | | |
| 8,304,495 B1 * | 11/2012 | Fan | C08L 67/02 | 428/35.7 |
| 10,344,144 B2 * | 7/2019 | Roth | C08K 5/1515 | |
| 2002/0075686 A1 * | 6/2002 | Kosugi | F21S 41/37 | 362/341 |
| 2003/0096122 A1 * | 5/2003 | Mercx | C08L 67/02 | 428/458 |
| 2004/0051088 A1 * | 3/2004 | Schlosser | C07F 9/485 | 252/609 |
| 2004/0138381 A1 * | 7/2004 | Blasius, Jr. | C08F 220/32 | 525/131 |
| 2006/0142422 A1 | 6/2006 | Kobayashi | | |
| 2006/0270824 A1 * | 11/2006 | Leemans | C08G 63/183 | 528/272 |
| 2007/0049667 A1 * | 3/2007 | Kim | C08K 5/053 | 524/127 |
| 2007/0049702 A1 * | 3/2007 | Kim | C08L 67/02 | 525/438 |
| 2007/0117897 A1 * | 5/2007 | Onda | C08K 5/098 | 524/394 |
| 2007/0244227 A1 * | 10/2007 | Eipper | C08L 67/02 | 523/400 |
| 2007/0244242 A1 * | 10/2007 | Agarwal | C08L 67/02 | 524/439 |
| 2007/0275242 A1 * | 11/2007 | Gopal | C08J 11/24 | 428/401 |
| 2007/0278762 A1 * | 12/2007 | Chang | B62M 9/02 | 280/261 |
| 2007/0282056 A1 * | 12/2007 | Schellekens | C08L 67/02 | 524/556 |
| 2008/0090965 A1 * | 4/2008 | Kim | C08L 67/02 | 525/117 |
| 2008/0132630 A1 * | 6/2008 | Konduri | C08L 67/02 | 524/414 |
| 2008/0167410 A1 * | 7/2008 | Shim | C08L 67/02 | 524/147 |
| 2008/0194741 A1 * | 8/2008 | Engelmann | C08L 67/00 | 524/100 |
| 2008/0221259 A1 * | 9/2008 | Eipper | C08L 67/02 | 524/538 |
| 2008/0227920 A1 | 9/2008 | Weber | | |
| 2008/0242783 A1 * | 10/2008 | Ganesan | C08G 63/19 | 524/413 |
| 2009/0014692 A1 * | 1/2009 | Borade | C08L 67/02 | 252/500 |
| 2009/0312500 A1 * | 12/2009 | Awojulu | C08L 71/00 | 525/403 |
| 2010/0004394 A1 * | 1/2010 | Higaki | C08L 25/12 | 525/72 |
| 2010/0061669 A1 * | 3/2010 | Murakami | F16C 17/107 | 384/100 |
| 2010/0120947 A1 * | 5/2010 | Kuhmann | C08J 5/18 | 523/400 |
| 2010/0256261 A1 * | 10/2010 | Kliesch | C08J 5/18 | 523/427 |
| 2011/0021676 A1 * | 1/2011 | Hoerold | C08K 5/0066 | 524/101 |
| 2011/0196098 A1 * | 8/2011 | Mettlach | C08L 67/02 | 525/166 |
| 2013/0137797 A1 | 5/2013 | Onda | | |
| 2014/0031454 A1 * | 1/2014 | Alidedeoglu | C08G 63/183 | 523/455 |
| 2014/0353544 A1 * | 12/2014 | Guo | C09K 5/14 | 252/75 |
| 2014/0357769 A1 * | 12/2014 | Zheng | C08L 69/00 | 524/116 |
| 2014/0357775 A1 * | 12/2014 | Furuta | C08K 5/098 | 524/399 |
| 2015/0353732 A1 * | 12/2015 | Wang | C08L 83/04 | 524/141 |
| 2015/0368458 A1 * | 12/2015 | Sun | C08L 67/02 | 523/400 |
| 2016/0160007 A1 * | 6/2016 | Wagner | C08K 5/098 | 524/101 |
| 2017/0039615 A1 * | 2/2017 | Gore | G06Q 30/0613 | |
| 2017/0190906 A1 * | 7/2017 | Mutou | C23C 14/14 | |
| 2017/0335085 A1 * | 11/2017 | Onda | C08K 5/103 | |
| 2018/0298189 A1 * | 10/2018 | Wagner | C08K 5/5313 | |
| 2019/0031827 A1 * | 1/2019 | Onda | C08J 3/203 | |

* cited by examiner

＃ POLY(BUTYLENE TEREPHTHALATE) COMPOSITION AND ASSOCIATED ARTICLE

This application is a national stage application of PCT/EP2016/061389, filed May 20, 2016, which claims priority to U.S. Provisional Patent Application No. 62/166,170 filed May 26, 2015, both of which are hereby incorporated by reference in their entirety.

BACKGROUND OF THE INVENTION

Lightweight automotive headlight reflectors and bezels can be prepared by coating a thin metal layer on a substrate made of plastic, such as polyester. However, it is typically necessary to apply a primer coat between the plastic substrate and the metal layer. The primer layer helps minimize distortion or "hazing" of the reflective metal layer when, in operation, the reflector or bezel encounters high temperatures and the outgassing of the plastic substrate occurs. There is a desire for plastic substrates with reduced outgassing at headlight operating temperatures. Preferably, the outgassing would be reduced enough for the primer coat to be omitted, and the metal layer to be coated directly on the plastic substrate.

BRIEF SUMMARY OF THE INVENTION

One embodiment is a composition comprising, based on the total weight of the composition: 95 to 99.99 weight percent of a poly(alkylene terephthalate) comprising 80 to 99.99 weight percent poly(butylene terephthalate); 0.01 to less than 1 weight percent of an epoxy compound having a weight average molecular weight of at least 500 daltons, and an epoxy equivalent weight of at least 400 grams per equivalent; and 0 to 4 weight percent of additives selected from the group consisting of stabilizers, mold release agents, flame retardants, nucleating agents, colorants, and combinations thereof; wherein the composition comprises 0 to less than 1 weight percent of impact modifiers; wherein the composition comprises 0 to less than 1 weight percent of copolymers of monomers comprising an unsubstituted or substituted styrene, and an unsaturated nitrile; and wherein the composition comprises 0 to less than 1 weight percent of reinforcing fillers.

Another embodiment is an article comprising a composition comprising: 95 to 99.99 weight percent of a poly(alkylene terephthalate) comprising 80 to 99.99 weight percent poly(butylene terephthalate); 0.01 to less than 1 weight percent of an epoxy compound having a weight average molecular weight of at least 500 daltons, and an epoxy equivalent weight of at least 400 grams per equivalent; and 0 to 4 weight percent of additives selected from the group consisting of stabilizers, mold release agents, flame retardants, nucleating agents, colorants, and combinations thereof; wherein the composition comprises 0 to less than 1 weight percent of impact modifiers; wherein the composition comprises 0 to less than 1 weight percent of copolymers of monomers comprising an unsubstituted or substituted styrene, and an unsaturated nitrile; and wherein the composition comprises 0 to less than 1 weight percent of reinforcing fillers.

These and other embodiments are described in detail below.

DETAILED DESCRIPTION OF THE INVENTION

The present inventors have determined that reduced high-temperature outgassing is exhibited by plastic substrates molded from a poly(butylene terephthalate) composition that includes less than 1 weight percent of a particular epoxy compound. Specifically, the epoxy compound has a weight average molecular weight of at least 500 daltons, and an epoxy equivalent weight of at least 400 grams per equivalent.

In an embodiment, the invention relates to a composition comprising, based on the total weight of the composition:
  95 to 99.99 weight percent of a poly(alkylene terephthalate);
  0.01 to less than 1 weight percent of an epoxy compound having a weight average molecular weight of at least 500 daltons, and an epoxy equivalent weight of at least 400 grams per equivalent; and
  0 to 4 weight percent of additives selected from the group consisting of stabilizers, mold release agents, flame retardants, nucleating agents, colorants, and combinations thereof;
  wherein the composition comprises 0 to less than 1 weight percent of impact modifiers;
  wherein the composition comprises 0 to less than 1 weight percent of copolymers of monomers comprising an unsubstituted or substituted styrene, and an unsaturated nitrile; and
  wherein the composition comprises 0 to less than 1 weight percent of reinforcing fillers.

One embodiment is a composition comprising, based on the total weight of the composition: 95 to 99.99 weight percent of a poly(alkylene terephthalate) comprising 80 to 99.99 weight percent poly(butylene terephthalate); 0.01 to less than 1 weight percent of an epoxy compound having a weight average molecular weight of at least 500 daltons, and an epoxy equivalent weight of at least 400 grams per equivalent; and 0 to 4 weight percent of additives selected from the group consisting of stabilizers, mold release agents, flame retardants, nucleating agents, colorants, and combinations thereof; wherein the composition comprises 0 to less than 1 weight percent of impact modifiers; wherein the composition comprises 0 to less than 1 weight percent of copolymers of monomers comprising an unsubstituted or substituted styrene, and an unsaturated nitrile; and wherein the composition comprises 0 to less than 1 weight percent of reinforcing fillers. It will be understood that the epoxy compound is reactive, and that the composition can also be described as the product of melt blending the recited components.

The composition comprises a poly(alkylene terephthalate). The alkylene group of the poly(alkylene terephthalate) can comprise 2 to 18 carbon atoms. In some embodiments, the alkylene group is selected from the group consisting of ethylene, 1,3-propylene, 1,4-butylene, 1,5-pentylene, 1,6-hexylene, 1,4-cyclohexylene, 1,4-cyclohexanedimethylene, and combinations thereof. In some embodiments, the alkylene group is selected from the group consisting of ethylene, 1,4-butylene, and combinations thereof.

It will be understood that the poly(alkylene terephthalate) can include small amounts (e.g., up to 10 weight percent, specifically up to 5 weight percent) of residues of monomers other than alkylene diols and terephthalic acid. For example, the poly(alkylene terephthalate) can include the residue of isophthalic acid. As another example, the poly(alkylene terephthalate) can comprises units derived from an aliphatic acid, such as succinic acid, glutaric acid, adipic acid, pimelic acid, 1,4-cyclohexanedicarboxylic acid, and combinations thereof.

It is preferred that the poly(alkylene terephthalate) is poly(butylene terephthalate).

In some embodiments, the poly(butylene terephthalate) has an intrinsic viscosity of 0.6 to 1.5 deciliter per gram measured at 30° C. in 60:40 weight/weight phenol/tetrachloroethane.

The composition comprises the poly(alkylene terephthalate) in an amount of 95 to 99.99 weight percent, based on the total weight of the composition. Within this range, the poly(alkylene terephthalate) amount can be 98 to 99.9 weight percent, specifically 98.5 to 99.5 weight percent.

The composition may for example comprise 98.5 to 99.5 weight percent of the poly(butylene terephthalate).

Most or all of the poly(alkylene terephthalate) is poly(butylene terephthalate). Specifically, the composition comprises poly(butylene terephthalate) in an amount of 80 to 99.99 weight percent, based on the total weight of the composition. Within this range, the poly(alkylene terephthalate) amount can be 90 to 99.9 weight percent, specifically 95 to 99.5 weight percent, more specifically 98.5 to 99.5 weight percent.

When the poly(alkylene terephthalate) does not consist of poly(butylene terephthalate), it can further include a second (chemically different) poly(alkylene terephthalate). In some embodiments, the second poly(alkylene terephthalate) is selected from the group consisting of poly(ethylene terephthalate), poly(1,3-propylene terephthalate), poly(1,5-pentylene terephthalate), poly(1,6-hexylene terephthalate), poly(1,4-cyclohexylene terephthalate), poly(1,4-cyclohexanedimethylene terephthalate), and combinations thereof. In some embodiments, the second poly(alkylene terephthalate) comprises poly(ethylene terephthalate). When present, the second poly(alkylene terephthalate) can be used in an amount of 0.5 to 19.99 weight percent, specifically 1 to 10 weight percent, based on the total weight of the composition.

In addition to the poly(alkylene terephthalate), the composition comprises an epoxy compound. The epoxy compound has a weight average molecular weight of at least 500 daltons. Within this limit, the epoxy compound weight average molecular weight can be 500 to 500,000 daltons, specifically 500 to 200,000 daltons, more specifically 1,000 to 100,000 daltons. Weight average molecular weight can be determined by gel permeation chromatography using polystyrene standards.

The epoxy compound also has an epoxy equivalent weight of at least 400 grams per equivalent. Within this limit, the epoxy equivalent weight can be 400 to 50,000 grams per equivalent, specifically 400 to 10,000 grams per equivalent. Epoxy equivalent weight can be determined by methods known in the art, including ASTM D1652-11e1, "Standard Test Method for Epoxy Content of Epoxy Resins".

The composition according to the invention preferably comprises 0.5 to less than 1 weight percent of an epoxy compound having a weight average molecular weight of at least 500 daltons, and an epoxy equivalent weight of at least 400 grams per equivalent.

In some embodiments, the epoxy compound is selected from the group consisting of poly(ethylene-glycidyl methacrylate)s, poly(ethylene-glycidyl methacrylate-methyl methacrylate)s, poly(ethylene-glycidyl methacrylate)-graft-poly(methyl methacrylate)s, epoxy-terminated polystyrene-block-poly(ethylene-butylene)-block-polyethylenes, bisphenol-epichlorohydrin copolymers, and combinations thereof. In some embodiments, the epoxy compound comprises a poly(ethylene-glycidyl methacrylate).

The composition comprises the epoxy compound (or its reacted residue) in an amount of 0.01 to less than 1 weight percent, based on the total weight of the composition. Within this range, the epoxy compound amount can be 0.01 to 0.99 weight percent, specifically 0.01 to 0.8 weight percent, more specifically 0.02 to 0.6 weight percent, still more specifically 0.05 to 0.4 weight percent. In some embodiments, the composition comprises 0.05 to 0.8 weight percent of the epoxy compound (or its reacted residue).

The composition can, optionally further include one or more additives known in the thermoplastic art. For example, the composition can comprise additives selected from the group consisting of stabilizers (including antioxidants, quenchers, and hydrolysis suppressing agents), mold release agents, flame retardants, nucleating agents, colorants, and combinations thereof. In some embodiments, the additives are selected from the group consisting of stabilizers, mold release agents, nucleating agents, colorants, and combinations thereof.

When present, the one or more additives can be used in a total amount of up to 4 weight percent, based on the total weight of the composition. Within this limit, the total amount of additives can be 0.1 to 4 weight percent, specifically 0.2 to 3 weight percent, more specifically 0.3 to 2 weight percent. In some embodiments, the composition comprises 0.2 to 1.5 weight percent of the additives, and wherein the additives are selected from the group consisting of stabilizers, mold release agents, nucleating agents, colorants, and combinations thereof.

The composition in a certain embodiment consists of, based on the total weight of the composition:
  95 to 99.99 weight percent of a poly(alkylene terephthalate);
  0.01 to less than 1 weight percent of an epoxy compound having a weight average molecular weight of at least 500 daltons, and an epoxy equivalent weight of at least 400 grams per equivalent; and
  0 to 4 weight percent of additives selected from the group consisting of stabilizers, mold release agents, flame retardants, nucleating agents, colorants, and combinations thereof.

Certain optional components of the composition are limited in their amounts. Specifically, the composition comprises 0 to less than 1 weight percent of impact modifiers, 0 to less than 1 weight percent of copolymers of monomers comprising an unsubstituted or substituted styrene, and an unsaturated nitrile, and 0 to less than 1 weight percent of reinforcing fillers. In some embodiments, the composition excludes impact modifiers. In some embodiments, the composition excludes copolymers of monomers comprising an unsubstituted or substituted styrene and an unsaturated nitrile. In some embodiments, the composition excludes reinforcing fillers. In some embodiments, the composition excludes flame retardants.

In certain embodiments, the composition excludes:
  copolymers of monomers comprising an unsubstituted or substituted styrene, and an unsaturated nitrile; and/or
  reinforcing fillers.

In a specific embodiment of the composition, the poly(butylene terephthalate) has an intrinsic viscosity of 0.6 to 1.5 deciliter per gram measured at 30° C. in 60:40 weight/weight phenol/tetrachloroethane; the epoxy compound comprises a poly(ethylene-glycidyl methacrylate); the additives are selected from the group consisting of antioxidants, mold release agents, phosphorous-containing compound such as metal hypophosphites, and combinations thereof; and the composition comprises 98.5 to 99.75 weight percent of the poly(butylene terephthalate), 0.05 to 0.8 weight percent of the epoxy compound, and 0.2 to 1.5 weight percent of the additives.

In a further embodiment, the composition comprises a phosphorous-containing compound. The phosphorous-containing compound may for example be a phosphite, diphosphite, phosphate or phosphonate.

For example, the phosphorous-containing compound may be a compound according to formula I, or a salt thereof:

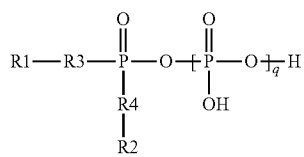

wherein:

R3 and R4 are each independently a direct bond or O;

R1 and R2 are independently selected from H, —OH, and substituted or unsubstituted $C_{1-20}$-alkyl, $C_{6-20}$-aryl, and poly(oxy $C_{2-4}$ alkylene), wherein a substituent, when present, is independently 1 or 2 in number on any of R1 and R2, and are independently selected from —OH, halogen, —COOH, —COOR5 wherein R5 is $C_{1-4}$ alkyl, and —NH$_2$; R1 and R2 may optionally be linked together by a $C_{2-20}$ hydrocarbylene bridge; and q is 0 or 1.

The phosphorous-containing compound may for example be a compound selected from phosphorous acid, phosphoric acid, disodium dihydrogen pyrophosphate, calcium hypophosphite, sodium hypophosphite, a stearic acid phosphate, aluminium tris-diethylphosphinate, sodium 2,2'-methylenebis(4,6-di-tert-butyl phenyl) phosphate, and/or a combination thereof. Preferably, the phosphorous-containing compound is selected from phosphorous acid, phosphoric acid, calcium hypophosphite, and/or sodium hypophosphite.

The use of such phosphorous-containing compound may contribute to reduction of outgassing, for example determined as haze.

The composition according to the invention may for example comprise 0.01 to 0.5 wt % based on the total weight of the composition of such phosphorous-containing compound, preferably 0.05-0.30 wt %, more preferably 0.05-0.20 wt %. The use of such quantities of such phosphorous-containing compound may also contribute to reduction of outgassing, for example determined as haze.

In one of its embodiments, the invention further relates to a composition, wherein the poly(butylene terephthalate) has an intrinsic viscosity of 0.6 to 1.5 deciliter per gram measured at 30° C. in 60:40 weight/weight phenol/tetrachloroethane;

wherein the epoxy compound comprises a poly(ethylene-glycidyl methacrylate);

wherein the additives are selected from the group consisting of antioxidants, mold release agents, metal hypophosphites, and combinations thereof; and wherein the composition comprises 98.5 to 99.75 weight percent of the poly(butylene terephthalate), 0.05 to 0.8 weight percent of the epoxy compound, and 0.01 to 0.5 weight percent of a phosphorous-containing compound selected from phosphorous acid, phosphoric acid, calcium hypophosphite, and/or sodium hypophosphite.

In a preferred embodiment, the composition comprises, based on the total weight of the composition:

95 to 99.99 weight percent of a poly(alkylene terephthalate);

0.01 to less than 1 weight percent of an epoxy compound having a weight average molecular weight of at least 500 daltons, and an epoxy equivalent weight of at least 400 grams per equivalent, wherein the epoxy compound is selected from the group consisting of poly(ethylene-glycidyl methacrylate)s, poly(ethylene-glycidyl methacrylate-methyl methacrylate)s, poly(ethylene-glycidyl methacrylate)-graft-poly(methyl methacrylate)s, epoxy-terminated polystyrene-block-poly(ethylene-butylene)-block-polyethylenes, bisphenol-epichlorohydrin copolymers, and combinations thereof; and 0.01 to 0.5 weight percent of a phosphorous-containing compound selected from phosphorous acid, phosphoric acid, calcium hypophosphite, and/or sodium hypophosphite.

wherein the composition comprises 0 to less than 1 weight percent of impact modifiers;

wherein the composition comprises 0 to less than 1 weight percent of copolymers of monomers comprising an unsubstituted or substituted styrene, and an unsaturated nitrile; and wherein the composition comprises 0 to less than 1 weight percent of reinforcing fillers.

Another embodiment is an article comprising a composition comprising: 95 to 99.99 weight percent of a poly(alkylene terephthalate) comprising 80 to 99.99 weight percent poly(butylene terephthalate); 0.01 to less than 1 weight percent of an epoxy compound having a weight average molecular weight of at least 500 daltons, and an epoxy equivalent weight of at least 400 grams per equivalent; and 0 to 4 weight percent of additives selected from the group consisting of stabilizers, mold release agents, flame retardants, nucleating agents, colorants, and combinations thereof; wherein the composition comprises 0 to less than 1 weight percent of impact modifiers; wherein the composition comprises 0 to less than 1 weight percent of copolymers of monomers comprising an unsubstituted or substituted styrene, and an unsaturated nitrile; and wherein the composition comprises 0 to less than 1 weight percent of reinforcing fillers.

All of the above-described variations in the composition apply as well to the article comprising the composition.

The composition is particularly suited for molding substrates for direct metallization. Thus, one embodiment of the article comprises a thermoplastic substrate comprising the composition, and a metal layer in contact with a surface of the thermoplastic substrate. Examples of such articles include automotive headlight reflectors and bezels.

An automotive headlamp may comprise a light source, a reflector, a bezel, a housing and a lens. These parts may be combined in such way that the light source is placed in a closed unit made up from the lens, the reflector, the bezel and the housing. The lens preferably has such transparency to allow the generated light to leave the headlamp in the direction to be illuminated. The reflector may be understood as a part that has such design as to ensure maximum reflection of the light generated by the light source in the desired direction to be illuminated. The bezel may also have a reflective area. The light source may be positioned centrally in the reflector, and the reflector may be positioned in the bezel. The bezel may be connected to the housing, and the housing comprising the bezel, the reflector and the light source may be covered by the lens to form a closed unit.

The bezel and the reflector may comprise polyesters such as poly(alkylene terephthalates). Poly(alkylene terephthalates) are lightweight materials having desired mechanical and thermal properties for application in such bezels and reflectors. It is further desired that the surface of the bezel and the reflector that are exposed to light generated by the light source have a high reflectivity. This may for example be achieved by applying a metallic layer to the exposed surface of the bezel and the reflector. This metallic layer needs to have a sufficient surface quality and durability to ensure sustained quality of the headlamp during the period of service in the vehicle in which the headlamp is placed. The occurrence of surface defects needs therefor to be avoided. One potential source of such surface defects is related to outgassing of material from the poly(alkylene terephthalate). For that reason, there is a need for compositions comprising poly(alkylene terephthalates) having reduced outgassing. This has now been achieved by the composition according to the embodiments of the present invention.

In the present application, the outgassing of material may for example be determined by measuring the haze of the compositions and the carbon emissions of the compositions as determined by gas chromatography.

The composition according to the present invention allows for the production of metallized parts such as reflectors and bezels for headlamps without need for application of a primer layer on the surface of the parts prior to metallization.

The invention includes at least the following embodiments.

Embodiment 1

A composition comprising, based on the total weight of the composition: 95 to 99.99 weight percent of a poly(alkylene terephthalate) comprising 80 to 99.99 weight percent poly(butylene terephthalate); 0.01 to less than 1 weight percent of an epoxy compound having a weight average molecular weight of at least 500 daltons, and an epoxy equivalent weight of at least 400 grams per equivalent; and 0 to 4 weight percent of additives selected from the group consisting of stabilizers, mold release agents, flame retardants, nucleating agents, colorants, and combinations thereof; wherein the composition comprises 0 to less than 1 weight percent of impact modifiers; wherein the composition comprises 0 to less than 1 weight percent of copolymers of monomers comprising an unsubstituted or substituted styrene, and an unsaturated nitrile; and wherein the composition comprises 0 to less than 1 weight percent of reinforcing fillers.

Embodiment 2

The composition of embodiment 1, wherein the poly(butylene terephthalate) has an intrinsic viscosity of 0.6 to 1.5 deciliter per gram measured at 30° C. in 60:40 weight/weight phenol/tetrachloroethane.

Embodiment 3

The composition of embodiment 1 or 2, comprising 98.5 to 99.5 weight percent of the poly(butylene terephthalate).

Embodiment 4

The composition of any one of embodiments 1-3, wherein the epoxy compound is selected from the group consisting of poly(ethylene-glycidyl methacrylate)s, poly(ethylene-glycidyl methacrylate-methyl methacrylate)s, poly(ethylene-glycidyl methacrylate)-graft-poly(methyl methacrylate)s, epoxy-terminated polystyrene-block-poly(ethylene-butylene)-block-polyethylenes, bisphenol-epichlorohydrin copolymers, and combinations thereof.

Embodiment 5

The composition of any one of embodiments 1-3, wherein the epoxy compound comprises a poly(ethylene-glycidyl methacrylate).

Embodiment 6

The composition of any one of embodiments 1-5, comprising 0.05 to 0.8 weight percent of the epoxy compound.

Embodiment 7

The composition of any one of embodiments 1-6, comprising 0.2 to 1.5 weight percent of the additives, and wherein the additives are selected from the group consisting of stabilizers, mold release agents, nucleating agents, colorants, and combinations thereof.

Embodiment 8

The composition of any one of embodiments 1-7, excluding copolymers of monomers comprising an unsubstituted or substituted styrene, and an unsaturated nitrile.

Embodiment 9

The composition of any one of embodiments 1-8, excluding reinforcing fillers.

Embodiment 10

The composition of embodiment 1, wherein the poly(butylene terephthalate) has an intrinsic viscosity of 0.6 to 1.5 deciliter per gram measured at 30° C. in 60:40 weight/weight phenol/tetrachloroethane; wherein the epoxy compound comprises a poly(ethylene-glycidyl methacrylate); wherein the additives are selected from the group consisting of antioxidants, mold release agents, metal hypophosphites, and combinations thereof; and wherein the composition comprises 98.5 to 99.75 weight percent of the poly(butylene terephthalate), 0.05 to 0.8 weight percent of the epoxy compound, and 0.2 to 1.5 weight percent of the additives.

Embodiment 11

An article comprising a composition comprising: 95 to 99.99 weight percent of a poly(alkylene terephthalate) comprising 80 to 99.99 weight percent poly(butylene terephthalate); 0.01 to less than 1 weight percent of an epoxy compound having a weight average molecular weight of at least 500 daltons, and an epoxy equivalent weight of at least 400 grams per equivalent; and 0 to 4 weight percent of additives selected from the group consisting of stabilizers, mold release agents, flame retardants, nucleating agents, colorants, and combinations thereof; wherein the composition comprises 0 to less than 1 weight percent of impact modifiers; wherein the composition comprises 0 to less than 1 weight percent of copolymers of monomers comprising an unsubstituted or substituted styrene, and an unsaturated nitrile; and wherein the composition comprises 0 to less than 1 weight percent of reinforcing fillers.

Embodiment 12

The article of embodiment 11, wherein the composition comprises 98.5 to 99.5 weight percent of the poly(butylene terephthalate).

Embodiment 13

The article of embodiment 11 or 12, wherein the epoxy compound is selected from the group consisting of poly(ethylene-glycidyl methacrylate)s, poly(ethylene-glycidyl methacrylate-methyl methacrylate)s, poly(ethylene-glycidyl methacrylate)-graft-poly(methyl methacrylate)s, epoxy-terminated polystyrene-block-poly(ethylene-butylene)-block-polyethylenes, bisphenol-epichlorohydrin copolymers, and combinations thereof.

Embodiment 14

The article of any one of embodiments 11-13, wherein the epoxy compound comprises a poly(ethylene-glycidyl methacrylate), and wherein the composition comprises 0.05 to 0.8 weight percent of the epoxy compound.

Embodiment 15

The article of any one of embodiments 11-14, wherein the composition comprises 0.2 to 1.5 weight percent of the additives, and wherein the additives are selected from the group consisting of stabilizers, mold release agents, nucleating agents, colorants, and combinations thereof.

Embodiment 16

The article of any one of embodiments 11-15, wherein the composition excludes copolymers of monomers comprising an unsubstituted or substituted styrene, and an unsaturated nitrile.

Embodiment 17

The article of any one of embodiments 11-16, wherein the composition excludes reinforcing fillers.

Embodiment 18

The article of embodiment 11, wherein the poly(butylene terephthalate) has an intrinsic viscosity of 0.6 to 1.5 deciliter per gram measured at 30° C. in 60:40 weight/weight phenol/tetrachloroethane; wherein the epoxy compound comprises a poly(ethylene-glycidyl methacrylate); wherein the additives are selected from the group consisting of antioxidants, mold release agents, metal hypophosphites, and combinations thereof; and wherein the composition comprises 98.5 to 99.75 weight percent of the poly(butylene terephthalate), 0.05 to 0.8 weight percent of the epoxy compound, and 0.2 to 1.5 weight percent of the additives.

Embodiment 19

The article of any one of embodiments 11-18, comprising a thermoplastic substrate comprising the composition, and a metal layer in contact with a surface of the thermoplastic substrate.

Embodiment 20

The article of any one of embodiments 11-19, wherein the article is an automotive headlight reflector or bezel.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Components used to form compositions are summarized in Table 1.

TABLE 1

| Component | Description |
|---|---|
| PBT 1 | Poly(butylene terephthalate), CAS Reg. No. 24968-12-5, having an intrinsic viscosity of 0.865-0.895 deciliter/gram at 30° C. in 60:40 weight/weight phenol/tetrachloroethane; obtained as 1100-211D from Chang Chun Plastics Co., Ltd. |
| PBT 2 | Poly(butylene terephthalate), CAS Reg. No. 24968-12-5, having an intrinsic viscosity of 1.23-1.30 deciliters/gram at 30° C. in 60:40 weight/weight phenol/tetrachloroethane; obtained as 1100-211X from Chang Chun Plastics Co., Ltd. |
| PBT 3 | Poly(butylene terephthalate), CAS Reg. No. 24968-12-5, having an intrinsic viscosity of 0.736-0.765 deciliter/gram at 30° C. in 60:40 weight/weight phenol/tetrachloroethane; obtained as 1200-211D from Chang Chun Plastics Co., Ltd. |
| Antioxidant | Tetrakis[methylene-3-(3',5'-di-t-butyl-4-hydroxyphenyl)-propionate]methane, CAS Reg. No. 6683-19-8; obtained as EVERNOX ™-10 from Everspring Chemicals Co., Ltd. |
| Mold Release | Copolymer of hexanedioic acid and 2,2-bis(octadecanoyloxymethyl)-1,3-propanediol, CAS Reg. No. 68130-34-7; obtained as LOXIOL ™ G70S from Emery Oleochemicals. |
| $Ca(H_2PO_2)_2$ | Calcium hypophosphite, CAS Reg. No. 7789-79-9. |
| $H_3PO_3$ | Phosphorous acid, CAS Reg. nr. 10294-56-1. |
| E-GMA 1 | Ethylene-glycidyl methacrylate copolymer, CAS Reg. No. 26061-90-5, derived from 88 weight percent ethylene and 12 weight percent glycidyl methacrylate, having an epoxy equivalent weight of 1180 grams/equivalent, and having a melt flow index of about 3 grams/10 minutes at 190° C. and 2.16 kilogram load; obtained as BONDFAST ™ E from Sumitomo Chemical Co., Ltd. |

TABLE 1-continued

| Component | Description |
|---|---|
| E-GMA 2 | Ethylene-glycidyl methacrylate copolymer, CAS Reg. No. 26061-90-5, derived from 94 weight percent ethylene and 6 weight percent glycidyl methacrylate, having an epoxy equivalent weight of 4900 grams/equivalent, and having a melt flow index of about 3 grams/10 minutes at 190° C. and 2.16 kilogram load; obtained as BONDFAST ™ 2C from Sumitomo Chemical Co., Ltd. |
| E-GMA-MA 1 | Ethylene-glycidyl methacrylate-methyl acrylate terpolymer, CAS Reg. No. 51541-08-3 derived from 70 weight percent ethylene, 3 weight percent glycidyl methacrylate, and 27 weight percent methyl acrylate, and having a melt flow index of about 7 grams/10 minutes at 190° C. and 2.16 kilogram load; obtained as BONDFAST ™ 7L from Sumitomo Chemical Co., Ltd. |
| E-GMA-MA 2 | Ethylene-glycidyl methacrylate-methyl acrylate terpolymer, CAS Reg. No. 51541-08-3 derived from 67 weight percent ethylene, 6 weight percent glycidyl methacrylate, and 27 weight percent methyl acrylate, having an epoxy equivalent weight of 2370 grams/equivalent, and having a melt flow index of about 7 grams/10 minutes at 190° C. and 2.16 kilogram load; obtained as BONDFAST ™ 7M from Sumitomo Chemical Co., Ltd. |
| E-GMA-MA 3 | Ethylene-glycidyl methacrylate-methyl acrylate terpolymer, CAS Reg. No. 51541-08-3 derived from 67 weight percent ethylene, 8 weight percent glycidyl methacrylate, and 25 weight percent methyl acrylate, and having a melt flow index of about 6 grams/10 minutes at 190° C. and 2.16 kilogram load; obtained as LOTADER ™ AX8900 Arkema. |
| Epoxy-fxd. styrene-acrylic oligomer | Epoxy-functionalized styrene-acrylic oligomer, CAS Reg. No. 01-00-2, having a weight average molecular weight of about 6100-7500 daltons, a glass transition temperature of about 55° C., and an epoxy equivalent weight of about 270-300 grams per equivalent; obtained as JONCRYL ™ ADR-4368 from BASF. |
| Cycloaliphatic epoxy | (3',4'-Epoxycyclohexyl)methyl 3,4-epoxycyclohexylcarboxylate, CAS 2386-87-0, having an epoxy equivalent weight of about 134 grams per equivalent; obtained as CELLOXIDE ™ 2021 P from Daicel Corporation. |
| BPADGE | Bisphenol A diglycidyl ether oligomer, CAS Reg. No. 25036-25-3, having an epoxy equivalent weight of about 500 grams per equivalent; obtained as D.E.R. ™ 661 from Dow. |

Each composition was prepared as following. All components were dry blended in a plastic bag using a SUPER FLOATER™ SFC-50 (Kawata Mfg. Co. Ltd.). The dry-blended mixture was added to the feed throat of a twin-screw extruder having a 44 millimeter internal diameter. The composition was compounded using barrel temperature was 260° C., a screw rotation rate of 200 rotations/minute, and a throughput of about 160 kilograms/hour. The extrudate was cooled, pelletized, and dried at 120° C. for 2 hours before use for injection molding.

Square plaques of dimensions 50 millimeters×50 millimeters×3 millimeters were injection molded on a 100 ton molding machine using a barrel temperature of 250° C. and a mold temperature of 80° C.

Headspace gas chromatography (GC) was used to evaluate the outgas performance of the compositions using a Perkin Elmer Clarus 500 gas chromatograph equipped with a CP wax column 50 meter×0.33 micrometer×2.0 micrometer and a Perkin Elmer Turbomatrix 40 Vtrap headspace sampler. Pellets or molded parts of the compositions were placed in GC vials. Molded parts were prepared having dimensions of 50×50×3 millimeters, and were injection molded at a resin temperature of 250° C. and a mold temperature of 80° C. using a 100 ton injection molding machine. The vial and contents were incubated at 120° C. for a period of 5 hours. The released vapors were then sampled for 0.02 minutes and injected by auto sampler into the gas chromatograph. The carbon emission was determined for each of the compositions. Emission values were reported as total carbon emission and calculated as micrograms of carbon per gram of sample.

The examples in Table 2 illustrate the effects of metal hypophosphite alone and in combination with an epoxy compound. The metal hypophosphite alone reduces outgassing (carbon emissions), and the combination of metal hypophosphite and epoxy compound further reduces outgassing (carbon emissions).

TABLE 2

| | C. Ex. 1 | C. Ex. 2 | Ex. 1 |
|---|---|---|---|
| COMPOSITIONS | | | |
| PBT 1 | 99.94 | 99.54 | 99.04 |
| Antioxidant | 0.06 | 0.06 | 0.06 |
| Mold Release | 0.00 | 0.30 | 0.30 |
| $Ca(H_2PO_2)_2$ | 0.00 | 0.10 | 0.10 |
| E-GMA 1 | 0.00 | 0.00 | 0.50 |
| PROPERTIES | | | |
| Carbon emission, pellets (µgC/g) | 50 | 28 | 19 |
| Carbon emission, parts (µgC/g) | 130 | 45 | 23 |

The examples in Table 3 illustrate the effects of composition on the optical property "haze". Haze values were determined on glass plates, which were placed on the top of the glass bottle containing 5 grams of pellets, and heated on the hot plate at 180° C. for 24 hours. After cooling down to room temperature, the haze measurements were conducted by haze meter (Murakami Color Research Laboratory, HM-150, JIS K7105) at 23° C. Comparison of Example 2 with Comparative Example 3 shows that the addition of 0.5 weight percent of an epoxy compound to a metal hypophosphite-containing composition substantially reduces haze.

Examples 3 and 4 and Comparative Examples 4 and 5 collectively illustrate the effects of phosphorous-containing compound such as phosphorous acid and metal hypophosphite, together with epoxy compound on haze. The phosphorous-containing compound and epoxy compound each substantially reduce haze, and their combination is associated with further haze reduction.

TABLE 3

|  | C. Ex. 3 | Ex. 2 | Ex. 14 | C. Ex. 4 | C. Ex. 5 | Ex. 3 | Ex. 4 |
|---|---|---|---|---|---|---|---|
| COMPOSITIONS | | | | | | | |
| PBT 1 | 99.54 | 99.04 | 99.44 | 0.00 | 0.00 | 0.00 | 0.00 |
| PBT 2 | 0.00 | 0.00 | 0.00 | 32.64 | 32.54 | 32.14 | 32.04 |
| PBT 3 | 0.00 | 0.00 | 0.00 | 67.00 | 67.00 | 67.00 | 67.00 |
| Antioxidant | 0.06 | 0.06 | 0.06 | 0.06 | 0.06 | 0.06 | 0.06 |
| Mold Release | 0.30 | 0.30 | 0.30 | 0.30 | 0.30 | 0.30 | 0.30 |
| $Ca(H_2PO_2)_2$ | 0.10 | 0.10 | | 0.00 | 0.10 | 0.00 | 0.10 |
| $H_3PO_3$ | | | 0.10 | | | | |
| E-GMA 1 | 0.00 | 0.50 | 0.10 | 0.00 | 0.00 | 0.50 | 0.50 |
| PROPERTY | | | | | | | |
| Haze (%), 180° C./24 hours | 1.2 | 0.3 | 0.2 | 2.8 | 1.0 | 0.6 | 0.2 |

The examples in Table 4 illustrate the effects of different types of epoxy compounds.

The property values in Table 4 show that the physical property values of this paragraph were relatively insensitive to the compositional variations.

Melt flow index (MFI) values, expressed in units of grams per 10 minutes, were determined according to ASTM D1238 using a temperature of 250° C. and a 2.16 kilogram load.

The epoxy compounds used in Examples 5-10 each have a weight average molecular weight of at least 500 daltons, and an epoxy equivalent weight of at least 400 grams per equivalent. These examples each exhibit a haze value less than 1 and a melt flow index of at least 44.9 grams per 10 minutes. Comparative Example 6, incorporating an epoxy-functionalized styrene-acrylic oligomer with an epoxy equivalent weight of about 270-300 grams per equivalent, exhibited low haze, but a substantially compromised (reduced) melt flow index of 29.8 grams per 10 minutes. Comparative Example 7, incorporating a cycloaliphatic epoxy with an epoxy equivalent weight of about 134 grams per equivalent, exhibited good melt flow but a very high haze value of 38.5.

TABLE 4

|  | Ex. 5 | Ex. 6 | Ex. 7 | Ex. 8 | Ex. 9 | C. Ex. 6 | C. Ex. 7 | Ex. 10 |
|---|---|---|---|---|---|---|---|---|
| COMPOSITIONS | | | | | | | | |
| PBT 1 | 99.04 | 99.04 | 99.04 | 99.04 | 99.04 | 99.04 | 99.04 | 99.04 |
| Antioxidant | 0.06 | 0.06 | 0.06 | 0.06 | 0.06 | 0.06 | 0.06 | 0.06 |
| Mold Release | 0.30 | 0.30 | 0.30 | 0.30 | 0.30 | 0.30 | 0.30 | 0.30 |
| $Ca(H_2PO_2)_2$ | 0.10 | 0.10 | 0.10 | 0.10 | 0.10 | 0.10 | 0.10 | 0.10 |
| E-GMA 1 | 0.50 | 0.00 | 0.00 | 0.00 | 0.00 | 0.00 | 0.00 | 0.00 |
| E-GMA 2 | 0.00 | 0.50 | 0.00 | 0.00 | 0.00 | 0.00 | 0.00 | 0.00 |
| E-GMA-MA 1 | 0.00 | 0.00 | 0.50 | 0.00 | 0.00 | 0.00 | 0.00 | 0.00 |
| E-GMA-MA 2 | 0.00 | 0.00 | 0.00 | 0.50 | 0.00 | 0.00 | 0.00 | 0.00 |
| E-GMA-MA 3 | 0.00 | 0.00 | 0.00 | 0.00 | 0.50 | 0.00 | 0.00 | 0.00 |
| Epoxy-fxd. styrene-acrylic oligomer | 0.00 | 0.00 | 0.00 | 0.00 | 0.00 | 0.50 | 0.00 | 0.00 |
| Cycloaliphatic epoxy | 0.00 | 0.00 | 0.00 | 0.00 | 0.00 | 0.00 | 0.50 | 0.00 |
| BPADGE | 0.00 | 0.00 | 0.00 | 0.00 | 0.00 | 0.00 | 0.00 | 0.50 |
| PROPERTIES | | | | | | | | |
| Haze (%), 180° C./24 h | 0.1 | 0.9 | 0.2 | 0.3 | 0.7 | 0.1 | 38.5 | 0.3 |
| Notched Izod (kg-cm/cm) | 4.3 | 4.4 | 4.2 | 4.1 | 4.3 | 4.2 | 4.2 | 4.2 |
| Flexural strength (kg/cm$^2$) | 879 | 879 | 883 | 881 | 882 | 897 | 899 | 912 |
| Flexural modulus (kg/cm$^2$) | 26252 | 26250 | 26300 | 26237 | 26237 | 26862 | 26756 | 26911 |
| HDT, 4.6 kg (° C.) | 178.1 | 182.2 | 180.2 | 182.1 | 180.8 | 183.1 | 182.9 | 182.7 |
| MFI, 250° C., 2.16 kg (g/10 min) | 46.3 | 44.9 | 46.3 | 45.3 | 44.9 | 29.8 | 48.2 | 50.0 |

Notched Izod impact strength values, expressed in units of kilogram-centimeter/centimeter were determined at 23° C. according to ASTM D256 using bar cross-sectional dimensions of 3.2 by 12.7 millimeters. Flexural strength and flexural modulus values, each expressed in units of kilograms/centimeter$^2$, were determined at 23° C. according to ASTM D790 using bar cross-sectional dimensions of 6.4× 12.7 millimeters, a support span of 100 millimeters, and a test speed of 2.5 millimeters/minute. Heat deflection temperature (HDT) values, expressed in units of degrees centigrade, were determined according to ASTM D648 using bar cross-sectional dimensions of 6.4×12.7 millimeters, a loading fiber stress of 4.6 kilograms, a heating rate of 2.0° C./minute, and a deflection of 0.25 millimeters at reading.

The examples in Table 5 illustrate the effects of epoxy compound concentration. Comparative Example 8, with no epoxy compound, exhibited a relatively high haze value of 1.2. Examples 11-13, with 0.1 to 0.5 weight percent epoxy compound, exhibited low haze values of 0.2, 0.5 and 0.2, respectively, but exhibited only slightly reduced melt flow relative to Comparative Example 8. Comparative Examples 9-11, with 1, 1.5 and 2 weight percent epoxy compound, respectively, exhibited low haze but progressively lower melt flow values. Although not indicated in Table 5, visual inspection of post-heated articles made from the Comparative Example 10 and 11 compositions also exhibited a poor surface appearance on the molded surface. Specifically, dots were observed on the molded surface.

TABLE 5

|  | C. Ex. 8 | Ex. 11 | Ex. 12 | Ex. 13 | C. Ex. 9 | C. Ex. 10 | C. Ex. 11 | Ex. 14 |
|---|---|---|---|---|---|---|---|---|
| COMPOSITIONS | | | | | | | | |
| PBT 1 | 99.54 | 99.44 | 99.29 | 99.04 | 98.54 | 98.04 | 97.54 | 99.44 |
| Antioxidant | 0.06 | 0.06 | 0.06 | 0.06 | 0.06 | 0.06 | 0.06 | 0.06 |
| Mold Release | 0.30 | 0.30 | 0.30 | 0.30 | 0.30 | 0.30 | 0.30 | 0.30 |
| $Ca(H_2PO_2)_2$ | 0.10 | 0.10 | 0.10 | 0.10 | 0.10 | 0.10 | 0.10 | |
| $H_3PO_3$ | | | | | | | | 0.10 |
| E-GMA 1 | 0.00 | 0.10 | 0.25 | 0.50 | 1.00 | 1.50 | 2.00 | 0.10 |
| PROPERTIES | | | | | | | | |
| Haze (%), 180° C./24 h | 1.2 | 0.2 | 0.5 | 0.2 | 0.1 | 0.1 | 0.1 | 0.2 |
| Notched Izod (kg-cm/cm) | 3.1 | 3.5 | 2.9 | 3.3 | 3.3 | 3.4 | 4.3 | 3.8 |
| Flexural strength ($kg/cm^2$) | 912 | 909 | 910 | 891 | 880 | 868 | 861 | 897 |
| Flexural modulus ($kg/cm^2$) | 26898 | 26716 | 26677 | 26590 | 26193 | 25861 | 25545 | 26509 |
| HDT, 4.6 kg (° C.) | 178.9 | 178.8 | 179.5 | 178.6 | 176.8 | 177.3 | 176.6 | 183.2 |
| MFI, 250° C., 2.16 kg (g/10 min) | 48.0 | 47.3 | 46.2 | 45.8 | 44.8 | 43.6 | 41.8 | 45.0 |

The invention claimed is:

1. A composition comprising, based on the total weight of the composition:
   98.5 to 99.5 weight percent of a poly(butylene terephthalate) having an intrinsic viscosity of 0.6 to 1.5 deciliter per gram measured 30° C. in 60:40 weight/weight phenol/tetrachloroethane;
   0.05 to 0.8 weight percent of an epoxy compound having a weight average molecular weight of 1,000 to 100,000 daltons, and an epoxy equivalent weight of 400 grams to 10,000 grams per equivalent, the epoxy compound comprising a poly(ethylene-glycidyl methacrylate);
   0.05 to 0.2 weight percent of a phosphorus-containing compound comprising calcium hypophosphite; and
   0.2 to 1.5 weight percent of additives selected from the group consisting of stabilizers, mold release agents, and combinations thereof.

2. The composition of claim 1, comprising 0.05 to 0.4 weight percent of the epoxy compound.

3. The composition of claim 1, excluding:
   copolymers of monomers comprising an unsubstituted or substituted styrene, and an unsaturated nitrile; and/or reinforcing fillers.

4. The composition of claim 1,
   wherein the additives comprise antioxidants and mold release agents.

5. An article comprising the composition of claim 1.

6. The article of claim 5, comprising a thermoplastic substrate comprising the composition, and a metal layer in contact with a surface of the thermoplastic substrate, wherein the article is an automotive headlight reflector or bezel.

7. The composition of claim 1, excluding:
   copolymers of monomers comprising an unsubstituted or substituted styrene, and an unsaturated nitrile; and/or reinforcing fillers.

8. The composition of claim 1, wherein the epoxy compound is derived from 88 weight percent ethylene and 12 weight percent glycidyl methacrylate, and the epoxy compound has an epoxy equivalent weight of 1180 grams/equivalent.

9. The composition of claim 1, wherein the epoxy compound is derived from 94 weight percent ethylene and 6 weight percent glycidyl methacrylate, and the epoxy compound has an epoxy equivalent weight of 4900 grams/equivalent.

10. The composition of claim 1 consisting essentially of, based on the total weight of the composition:
    98.5 to 99.5 weight percent of the poly(butylene terephthalate;
    0.05 to 0.8 weight percent of the epoxy compound;
    0.05 to 0.2 weight percent of calcium hypophosphite; and
    0.2 to 1.5 weight percent of additives selected from the group consisting of stabilizers and mold release agents.

11. The composition of claim 10, wherein the additives comprise stabilizers and mold release agents.

12. The composition of claim 10, wherein the epoxy compound is derived from 88 weight percent ethylene and 12 weight percent glycidyl methacrylate, and the epoxy compound has an epoxy equivalent weight of 1180 grams/equivalent.

13. The composition of claim 10, wherein the epoxy compound is derived from 94 weight percent ethylene and 6 weight percent glycidyl methacrylate, and the epoxy compound has an epoxy equivalent weight of 4900 grams/equivalent.

14. An article comprising the composition of claim 10.

15. The article of claim 14, comprising a thermoplastic substrate comprising the composition, and a metal layer in contact with a surface of the thermoplastic substrate, wherein the article is an automotive headlight reflector or bezel.

16. A composition comprising, based on the total weight of the composition:
    98.5 to 99.5 weight percent of a poly(butylene terephthalate) having an intrinsic viscosity of 0.6 to 1.5 deciliter per gram measured 30° C. in 60:40 weight/weight phenol/tetrachloroethane;
    0.05 to 0.8 weight percent of an epoxy compound having a weight average molecular weight of 1,000 to 100,000 daltons, and an epoxy equivalent weight of 400 grams to 10,000 grams per equivalent, the epoxy compound being selected from the group consisting of poly(ethylene-glycidyl methacrylate)s, poly(ethylene-glycidyl methacrylate-methyl methacrylate)s, poly(ethylene-glycidyl methacrylate)-graft-poly(methyl methacrylate)s, bisphenol-epichlorohydrin copolymers, and combinations thereof;
    0.05 to 0.2 weight percent of a phosphorus-containing compound comprising calcium hypophosphite; and
    0.2 to 1.5 weight percent of additives selected from the group consisting of stabilizers, mold release agents, and combinations thereof.

\* \* \* \* \*